Patented Aug. 20, 1940

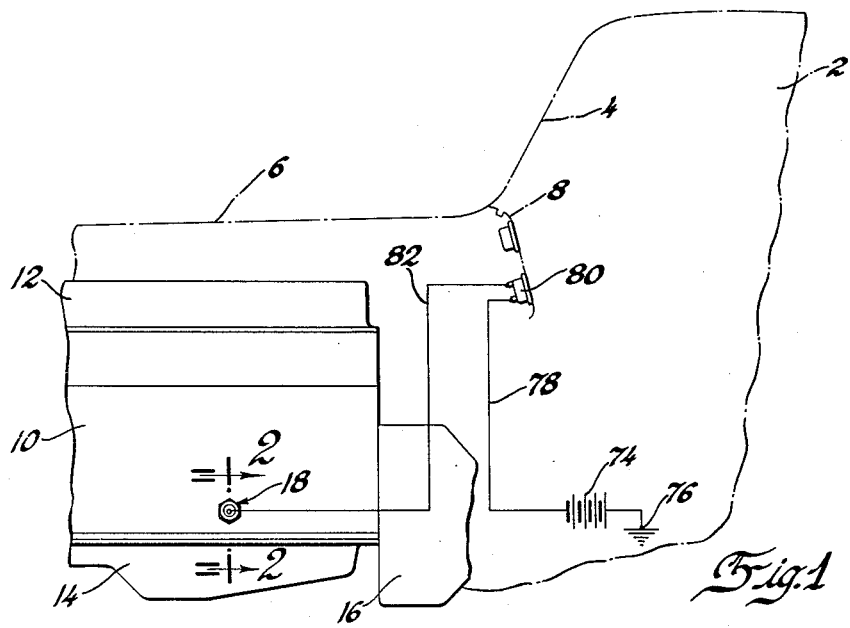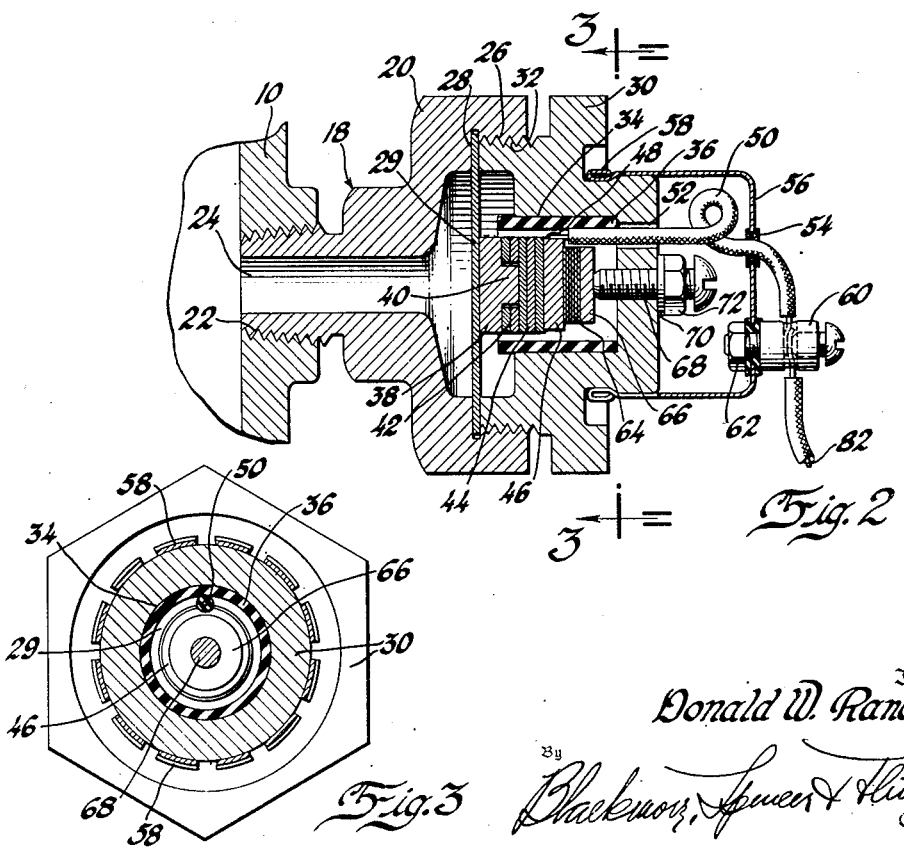

2,212,247

UNITED STATES PATENT OFFICE 2,212,247

TEMPERATURE COMPENSATING ELECTRIC PRESSURE GAUGE

Donald W. Randolph, Flint, Mich., assignor to General Motors Corporation, Detroit, Mich., a corporation of Delaware Application May 5, 1938, Serial No. 206,236

9 Claims. (Cl. 201—51)

This invention relates to oil pressure gauges used in connection with the lubricating systems of internal combustion engines of automotive vehicles. The oil pressure gauge is of the electrical type and comprises an engine unit mounted at the engine block in the lubricating system and a differential galvanometer at the instrument panel of the vehicle. The engine unit comprises an electric resistance, the conductivity of which is varied by the oil pressure exerted on a diaphragm and as the conductivity varies, a greater or less amount of current is allowed to pass through the system to register on the differential galvanometer at the instrument panel. The galvanometer having been graduated to read directly in pressures, the pressure in the oiling system can be read directly by observing the position of the pointer on the dial of the galvanometer.

The engine unit of the invention comprises a stack of carbon or titanium oxide discs which are supported on a diaphragm which is subject to the pressure of the lubricating system of the engine. As the pressure acts on the diaphragm it will tend to compact the discs or press them closer together to enable the passage of a greater amount of current.

There is also to be considered the matter of the expansion of the metallic parts of the unit due to the change in temperature of the engine, and also the increase in electric conductivity of the carbon or titanium oxide with an increase in temperature. When the engine has been standing for some time and the parts are cold, the unit may be calibrated to operate with the parts at this temperature, but as the heat of the engine increases, the parts of the unit expand, which will cause an additional amount of pressure to be exerted on the stack of carbon or titanium oxide discs and closer press them together. This will result in an inaccurate pressure reading. To compensate for this expansion of parts due to change in temperatures, the unit is made of at least two kinds of metal, one metal comprising the base and contacts, and the other the cap, and by making the cap of a metal which has a coefficient of expansion which is greater than that of the base, the greater rate of expansion of the cap will compensate for the additional pressure which would be exerted on the stack were the two elements of the same metal. Therefore, as the temperature of the parts increases and endeavors to compact the stack of carbon or titanium oxide discs, the differential in expansion between the cap and the base will allow the cap to expand at a greater rate and maintain the pressure on the discs substantially constant except for the pressure exerted by the oil acting on the diaphragm. This differential expansion of the cap relative to the rest of the structure is also so calibrated that it takes care of the increased conductivity of the stack due to a rise in temperature. The increased expansion of the cap will release the pressure on the stack.

On the drawing:

Figure 1 is a more or less diagrammatic view of a part of an automotive vehicle showing the invention applied.

Figure 2 is an enlarged sectional detailed view on the line 2—2 of Figure 1.

Figure 3 is a sectional view on the line 3—3 of Figure 2.

Referring to the drawing, the numeral 2 indicates the vehicle as a whole. The vehicle has the windshield 4, the hood 6, instrument panel 8, internal combustion engine 10 having the head 12 and the oil pan 14. The flywheel of the housing is indicated at 16. The engine 10 has the usual oil pump (not shown) to force lubricant through the oiling system of the engine in the usual way. The parts so far described are conventional and per se form no part of the invention.

The engine unit 18 of the invention is mounted on the engine 10 at any point where it is accessible to the lubricating system. This unit comprises the metal base or housing member 20 which is screw threaded as at 22 and screwed into a suitable opening in the engine block 10. The housing 20 is provided with a bore 24 so that the oil of the lubricating system may have access to the interior of the housing. The housing 20 has an enlarged outer end which is internally screw threaded as indicated at 26 and a shoulder 28 is provided immediately below the screw threaded part 26. On the shoulder 28 the metallic diaphragm 29 is received and this diaphragm is held in place by means of the metallic cap 30 having the screw threaded part 32 which fits into the threaded part 26 of the housing 20.

The cap 30 is preferably made of a metal different from the metal of the base or housing 20. For example, if the housing 20 is made of cast iron the cap 30 will be made of aluminum for the reason that aluminum has a greater coefficient of expansion than cast iron.

The cap 30 has a bore 34 in which the insulating cylinder 36 is secured.

On the diaphragm 29 there is supported the lower contact 38 which has a projecting part 40 extending toward the cap 30. On this projecting part 40 there are received the plurality of washers 42 which may be made either of carbon or titanium oxide. Over the washers 42 and the top projection 40 additional discs 44 of titanium oxide or carbon are positioned. On the drawing there have been shown but two washers 42 and three discs 44 which comprise a stack, but obviously any convenient number may be used, the number of parts 42 and 44 shown being for purposes of illustration only. Over the carbon discs 44 there is positioned the contact 46 which has secured thereto as at 48 the end of a wire 50 which passes through an opening 52 on the cap and is mounted by means of the insulation 54 on the hood 56 which is secured over the end of the cap 30 by means of the spring fingers 58. A binding post 60 mounted in the hood 56 and secured therein by the nut 62 supports the external end of the wire 50.

Over the contact 46 and 48 is supported a plurality of insulating members such as mica discs 64 and over the discs 64 the metallic end piece 66 is received. The end piece 66 constitutes a wear member. A screw 68 is threaded into an opening in the end of the cap 30 and has its end resting on the end piece 66 and is adapted to hold the parts together and under a definite amount of compression. The screw 68 has the washer 70 and the lock nut 72 secured thereto.

Referring to Figure 2, it will be understood that if the parts as they appear in the figure are calibrated in the cold position, there will be the tendency further to compress the carbon or titanium oxide discs 42 and 44 when the temperature increases because of the expansion of the parts due to heat, and the degree of compression of these discs will determine the amount of electric current which will pass therethrough. The greater the compression, the greater the electrical conductivity. Inasmuch as the compression of the discs must remain constant, except for the pressure exerted through the oil acting on the diaphragm 29, it is necessary to compensate for the expansion of the parts and the compression of the stack due to heat. This compensation is taken care of by making the cap 30 of aluminum while the base or housing 20 and the parts 38, 46, and 66 are preferably made of cast iron. As the heat causes the parts to expand, the greater degree of expansion of the aluminum will compensate for the expansion of the diaphragm 29 and the contacts 38 and 46 and end piece 66 and screw 68. If these parts were allowed to expand without any degree of compensation, obviously they would tend to compress the discs 42 and 44. The increased expansion of the aluminum will relieve the pressure of the stack and in this way reduce the electric conductivity of the stack because of its increase in temperature.

Referring to Figure 1, the electric circuit is indicated. The battery is shown at 74 grounded to the frame of the car as at 76. A wire 78 leads from the battery to a differential galvanometer 80 mounted on the instrument board 8. From the galvanometer 80 a second wire 82 leads to the unit 18 in the lubricating system. The current will pass from the battery 74, through the wire 78, through the differential galvanometer 80, through the wire 82, to the wire 50, through the contact 46, through the stack comprising the elements 42 and 44, through the end contact 38, through the diaphragm 29, through the housing 20, and then to the engine block 10 and back to ground at 76. The amount of current passing through the stack 42—44 will depend upon the temperature of the stack and the degree of compression thereof, or the pressure exerted thereon.

The greater the amount of pressure on and the higher the temperature of the stack, the greater the electric conductivity, and as expansion of the aluminum cap 30 compensates for temperature changes by decreasing the pressure on the stack, the degree of electric conductivity is determined by the oil pump which is constantly forcing oil through the bore 44 against the diaphragm 29, and the oil pressure from the pump will cause the stack to be compressed to allow more current to be passed therethrough. This additional current will be registered on the galvanometer 80 at the instrument board. The galvanometer 80 is of the type shown in the Bacon Patent 1,791,786. By suitably graduating the dial of the galvanometer 80 to read in pressures directly instead of units of electrical current, the pressure in the oiling system of the engine may be read directly.

I claim:

1. In an electrical resistor, a metallic housing, a metallic cap forming a closure for said housing, a stack of electrically conductive discs in the cap and mounted in the housing and forming a pressure responsive resistance, means in the housing to exert a varying pressure on one side of the stack, means in the cap on the other side of the stack to retain the stack in position, said cap being of a metal having a coefficient of expansion sufficient to compensate for differences in pressure on the discs caused by changes in temperature in the discs and the metal parts of the resistor.

2. In an electric resistor, a metallic housing, a metallic cap secured to and forming a closure for the housing, a diaphragm in the housing secured in place between the housing and the cap, a stack of electric conducting discs in the housing and sustained by the diaphragm and forming a pressure responsive resistance, means on the cap to vary the pressure exerted on the stack, an electric connection at the end of the stack leading through the cap, and coefficient of expansion of the metal of the cap compensating for differences in pressure exerted on the stack due to changes in temperature of the parts.

3. In an electrical resistor, a metallic housing, a metallic cap secured to and forming a closure for the housing, a diaphragm supported between the housing and the cap, a metallic contact member supported on the diaphragm, a stack of electric conducting discs supported on the contact member and forming a pressure responsive resistance, a second contact member at the end of the discs, means interrelated with the cap adapted to vary the pressure exerted on the stack, means to insulate said pressure exerting means from the stack, the coefficient of expansion of the metal of said cap compensating for the differences in pressure on the stack caused by changes in temperature of the parts of the resistor.

4. In an electric resistor, a metallic housing, a metallic cap for said housing, a metallic diaphragm supported between the housing and the cap, a metallic contact supported by the diaphragm, a stack of carbon discs supported on the contact and forming a pressure responsive resistance, a second metallic contact supported by the stack, insulation supported by the second contact, a wear member supported on the insulation, and an adjusting screw in the cap having its end abutting against the wear member and being capable of adjustment to vary the pressure between the elements of the stack, the coefficient of expansion of the metal of the cap compensating for differences in pressure on the stack caused by changes in temperature of the elements of the resistor.

5. In an electrical resistor, a metallic housing, a metallic cap secured to and forming a closure for the housing, a metallic diaphragm secured between the housing and the cap, a stack of carbon discs supported on the diaphragm and forming a pressure responsive resistance, means on the cap to compress the stack, said cap being of a metal having a coefficient of expansion different from the coefficient of expansion of the metal of the housing and being sufficient to compensate for changes in electrical conductivity caused by changes in pressure exerted on the stack due to changes in temperature of the parts.

6. In an electrical resistor, a metallic housing, a hollow metallic cap secured to the housing, a diaphragm mounted in the housing, a stack or pile of electrically conductive discs supported on the diaphragm and projecting into the hollow cap and forming an electric pressure responsive resistance, an insulating member in the cap surrounding the stack, means on the cap to exert pressure on the stack, said cap being of a metal having a coefficient of expansion sufficient to cause a decrease in pressure on the stack with an increase in temperature of the parts of the resistor, to compensate for the increased electrical conductivity caused by an increase in the temperature of the discs and by the increase in pressure on the stack due to expansion of the metal parts.

7. In an electrical resistor, a metallic housing, a hollow metallic cap secured to the housing, a diaphragm secured in the housing, a metal contact supported on the diaphragm, said contact having a projection, carbon washers fitting over the projection, carbon discs supported on the carbon washers and forming an electric pressure responsive resistance, said carbon elements extending into the hollow of the cap, and means to place the carbon washers and discs under compression, said cap being of a metal having a coefficient of expansion sufficient to cause the cap to expand at a rate to compensate for differences in electrical conductivity of the discs caused by changes in pressure thereon produced by changes in temperature of the parts of the resistor and by changes in temperature of the discs.

8. In an electric resistor, a metallic housing, a shoulder in said housing, a threaded part on the housing, a diaphragm positioned on the shoulder, a metallic cap having a threaded part screwed into the threads of the housing for holding the diaphragm on the shoulder, a stack of electrically conductive discs mounted on the diaphragm and forming a pressure responsive resistance, said stack projecting into the cap, means mounted on the cap and adapted to exert pressure on the stack, the metal of said cap being such that the expansion of the cap avoids differences in pressure on the discs caused by changes in temperature in the discs and the metallic parts of the resistor.

9. In an electric resistor, a metallic housing, a shoulder in said housing, a threaded part on the housing, a diaphragm positioned on the shoulder, a metallic cap having a threaded part screwed into the threads of the housing and holding the diaphragm on the shoulder, a stack of electrically conductive discs mounted on the diaphragm and forming a pressure responsive resistance, said stack projecting into the cap, an insulating member in the cap surrounding the stack, means mounted on the cap and adapted to exert pressure on the stack, the cap being of such metal that expansion of the cap avoids differences in pressure on the discs caused by changes in temperature in the discs and the metallic parts of the resistor.

DONALD W. RANDOLPH.